United States Patent
Fensore et al.

(10) Patent No.: US 8,586,244 B2
(45) Date of Patent: Nov. 19, 2013

(54) ALKALINE ELECTROCHEMICAL CELL HAVING A NEGATIVE ELECTRODE WITH SOLID ZINC OXIDE AND A SURFACTANT

(75) Inventors: Alex T. Fensore, Avon, OH (US); Jianjun Wu, Olmsted Township, OH (US); Katherine E. Ayers, Glastonbury, CT (US)

(73) Assignee: Eveready Battery Co., Inc., St. Louis, MO (US)

( * ) Notice: Subject to any disclaimer, the term of this patent is extended or adjusted under 35 U.S.C. 154(b) by 1143 days.

(21) Appl. No.: 11/901,803

(22) Filed: Sep. 19, 2007

(65) Prior Publication Data

US 2008/0241683 A1 Oct. 2, 2008

Related U.S. Application Data

(60) Provisional application No. 60/921,401, filed on Apr. 2, 2007.

(51) Int. Cl.
*H01M 4/48* (2010.01)

(52) U.S. Cl.
USPC ................. 429/231; 429/212; 429/229

(58) Field of Classification Search
USPC ........................ 429/212, 229, 231
See application file for complete search history.

(56) References Cited

U.S. PATENT DOCUMENTS

| | | |
|---|---|---|
| 4,777,100 A | 10/1988 | Chalilpoyil et al. |
| 5,128,222 A | 7/1992 | Yoshizawa et al. |
| 5,401,590 A | 3/1995 | Chalilpoyil et al. |
| 5,424,145 A * | 6/1995 | Tomantschger et al. ........ 429/57 |
| 6,872,489 B2 | 3/2005 | Armacanqui et al. |
| 7,008,723 B2 | 3/2006 | Daniel-Ivad et al. |
| 7,045,252 B2 | 5/2006 | Christian et al. |
| 7,056,617 B2 | 6/2006 | Kelsey et al. |
| 7,066,970 B2 | 6/2006 | Gilicinski et al. |
| 7,255,720 B2 | 8/2007 | Phillips |
| 2002/0033116 A1 | 3/2002 | Spencer et al. |
| 2002/0068220 A1* | 6/2002 | Wyler et al. .................... 429/231 |
| 2003/0068549 A1* | 4/2003 | Daniel-Ivad et al. .......... 429/212 |
| 2004/0258608 A1* | 12/2004 | Cayton et al. ............... 423/592.1 |
| 2005/0064292 A1* | 3/2005 | Phillips et al. ................. 429/246 |
| 2005/0123833 A1 | 6/2005 | Schubert et al. |
| 2006/0046135 A1* | 3/2006 | Huang ........................... 429/128 |
| 2006/0068288 A1 | 3/2006 | Johnson |

(Continued)

FOREIGN PATENT DOCUMENTS

| | | |
|---|---|---|
| JP | 59-035360 | 2/1984 |
| JP | 01134862 A * | 5/1989 |
| WO | 2008051508 A | 5/2008 |
| WO | 2008057401 A | 5/2008 |

OTHER PUBLICATIONS

"National Industrial Chemicals Notification and Assessment Scheme, Full Public Report, BYK-LP N 6482—Polymer In Disperbyk 190", File No. NA/430, by Worksafe Australia, 8 pgs., Jan. 1997.

(Continued)

*Primary Examiner* — Zachary Best

(74) *Attorney, Agent, or Firm* — Robert C. Baraona

(57) ABSTRACT

An alkaline electrochemical cell comprising a negative electrode, wherein the negative electrode includes zinc as an active material and further includes a synergistic combination of a solid zinc oxide and a surfactant. More particularly, the invention discloses an alkaline electrochemical cell that is capable of providing improved service when utilized by high drain devices.

10 Claims, 1 Drawing Sheet

(56) References Cited

U.S. PATENT DOCUMENTS

2006/0121204 A1 6/2006 Nakae et al.
2006/0121347 A1 6/2006 Zheng
2006/0285195 A1 12/2006 Moriyama et al.

OTHER PUBLICATIONS

"Product Information Sheet, Disperbyk-190", Dr. Wittek-Hufnagel, 1 page, Sep. 26, 2003.
"Data Sheet W210, Wetting and Dispersing Additives for Aqueous Systems and Pigment Concentrates", BYK-Chemie Gmbh, Wesel, Germany, Dec. 2005, 4 pgs.
"Material Safety Data Sheet, U.S. and Canada", prepared by Joanne Nole of BYK-Chemie USA, Inc., Wallingford, CT 06492, Jan. 1, 2005, 2 pgs.
"Regulatory Information Data Sheet (RIDS)", prepared by Megan McCutcheon of BYK-Chemie USA, Inc., Wallingford, CT 06492, Jan. 1, 2002, 2 pgs.
Patent Cooperation Treaty (PCT), International Search Report and Written Opinion for Application No. PCT/US2008/002945, filed Mar. 6, 2008, mailed Sep. 10, 2008, European Patent Office, Netherlands.

* cited by examiner

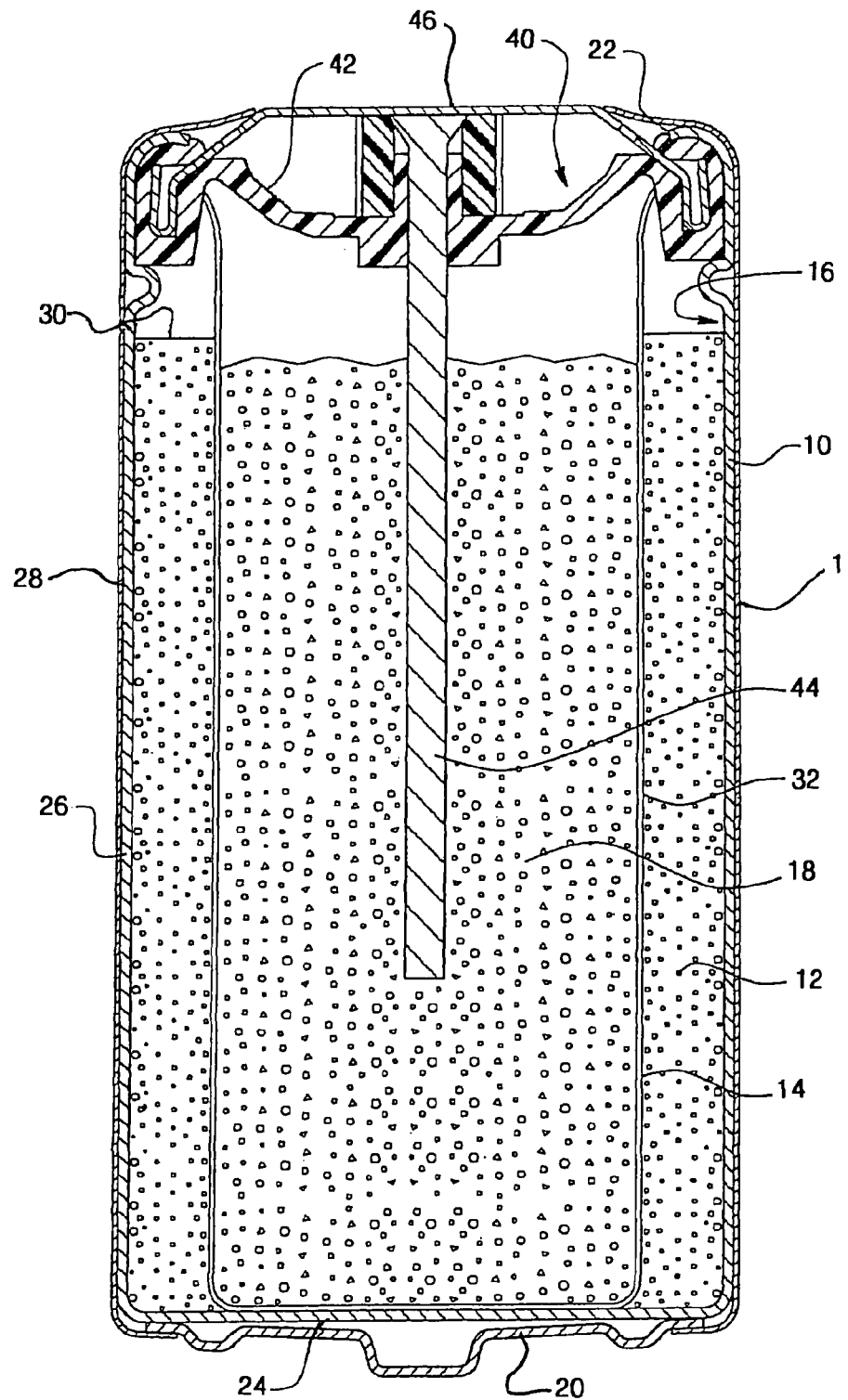

ALKALINE ELECTROCHEMICAL CELL HAVING A NEGATIVE ELECTRODE WITH SOLID ZINC OXIDE AND A SURFACTANT

CROSS REFERENCE

This application claims the benefit of priority under 35 U.S.C. §119 of U.S. Provisional Application Ser. No. 60/921,401 filed on Apr. 2, 2007.

FIELD OF THE INVENTION

The present invention relates to a negative electrode and to an alkaline electrochemical cell comprising the negative electrode, wherein the negative electrode includes zinc as an active material and further includes a synergistic combination of a solid zinc oxide and a surfactant. More particularly, the invention discloses an alkaline electrochemical cell that is capable of providing improved service when utilized by high drain devices.

BACKGROUND OF THE INVENTION

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

U.S. Pat. No. 4,777,100 relates to reportedly reducing corrosion in aqueous electrochemical cells having zinc anodes comprised of single crystal zinc particles by the addition of small amounts of a gas inhibiting surfactant, for example, an organic phosphate inhibitor such as RA600 from GAF Corp. to the cell. A synergistically lowered rate of corrosion and cell gassing is reportedly obtained even with reduction of mercury content.

U.S. Pat. No. 5,401,590 relates to a method for inhibiting the occurrence of load voltage instability in zinc anodic alkaline cells. The anode active material contains a gelled slurry of zinc alloy particles, a gelling agent, an aqueous alkaline solution and a mixed surfactant containing an anionic surfactant and a nonionic surfactant. The gelled anode active material reportedly inhibits the occurrence of load voltage instability and reportedly simultaneously reduces hydrogen evolution even though the cell contains no added amounts of mercury.

U.S. Pat. No. 6,872,489 discloses a sulfonic acid type organic surfactant which is incorporated into the gelled anode of an alkaline electrochemical cell, optionally with an organic phosphate ester surfactant. When the two surfactants are provided in a gelled anode in combination, discharge leakage is reportedly reduced and gel gassing is reportedly suppressed relative to that of gels lacking both surfactants. Additionally, cell discharge performance is reportedly improved relative to that of cells lacking both surfactant additives.

U.S. Pat. No. 7,008,723 relates to a method of manufacturing an anode composition for use in an electrochemical cell, in which the anode comprises an electrochemically active material, the method comprising the steps of mixing the electrochemically active material with an alkaline electrolyte solution, an organic surfactant, an indium compound, and a gelling agent, such that the indium compound or a portion thereof is added in an alkaline environment.

U.S. Pat. No. 7,045,252 relates to an alkaline battery which includes a cathode including lambda-manganese dioxide and gamma-manganese dioxide, an anode including zinc, a separator between the cathode and the anode, and an alkaline electrolyte contacting the anode and the cathode.

U.S. Pat. No. 7,056,617 relates to a non-hermetically sealed, electrochemical power source, including a first electrode, a second electrode, a separator between the first electrode and the second electrode, and a membrane in fluid communication with an environment external to the battery. The second electrode is between the separator and the membrane. The membrane includes a first portion having a different property, e.g., density, porosity, mass transport resistance, thickness, or gas permeability, than a second portion of the membrane. Methods of designing an electrochemical cell cartridge are also disclosed.

U.S. Pat. No. 7,066,970 relates to electrochemical cells and methods of making cells. In some embodiments, an electrochemical cell includes a housing, a negative electrode in the housing, a positive electrode in the hosing, the positive electrode including a wax, and a separator between the negative and positive electrodes.

U.S. Publication No. 2005/0123833 relates to a copolymer of an ethylenically unsaturated carboxylic acid, e.g., acrylic or methacrylic acid, and an aromatic sulphonate or carboxylate, e.g., sodium styrene sulphonate, either alone or supported on a substrate, that may be used as a separator for an electrochemical cell such as a silver-zinc cell or a zinc-air cell.

U.S. Publication No. 2006/0068288 relates to an alkaline electrochemical cell capable of providing optimum discharge efficiencies at both a high tech drain rate and a low drain rate. In one embodiment, the ratio of the anode's electrochemical capacity to the cathode's electrochemical capacity is between 1.33:1 and 1.40:1 and the surface area of the anode to cathode interface is maximized.

Japanese Publication No. 59-035360 relates to reportedly increasing cycle life by forming a zinc electrode of an alkaline electrode with an active material prepared by adding hydrophilic short fiber, an additive, and a binder to zinc oxide powder and metal zinc powder both having a specified particle size.

SUMMARY OF THE INVENTION

In view of the above, there is a need for an alkaline electrochemical cell that has the ability to provide adequate run times in devices that require a battery to discharge at a high drain rate, as well as to provide adequate run times in devices that require the battery to discharge at a low drain rate. There is especially a need for an alkaline electrochemical cell that performs well during a high drain test, such as a digital still camera (DSC) test.

It is an object of the present invention to provide an electrochemical cell capable of discharging in an efficient manner under a variety of discharge conditions, especially at a high rate of discharge.

It is a further object of the present invention to provide an alkaline electrochemical cell including a negative electrode comprising zinc, solid zinc oxide and a surfactant in effective amounts which provides the cell with an improved digital still camera test service, especially when compared to a cell without the solid zinc oxide and the surfactant.

In one aspect of the present invention, a primary alkaline electrochemical cell is disclosed, comprising a container and an electrode assembly disposed within the container and comprising a positive electrode, a negative electrode, a separator located between the positive electrode and the negative electrode, and an alkaline electrolyte, wherein the negative electrode comprises zinc, solid zinc oxide and a surfactant adsorbed on a surface of the solid zinc oxide, wherein the surfactant comprises a water soluble block copolymer, and wherein the block copolymer has at least one anionic functional group and at least one nonionic functional group.

In another aspect of the present invention, a primary alkaline electrochemical cell is disclosed, comprising a container, and an electrode assembly disposed within the container and comprising a positive electrode comprising manganese dioxide, a negative electrode, a separator located between the positive electrode and the negative electrode, and an alkaline electrolyte, wherein the negative electrode comprises zinc, solid zinc oxide and a surfactant comprising a water soluble block copolymer, and wherein the solid zinc oxide has a BET surface area greater than 8 $m^2/g$.

In yet another aspect of the present invention, a primary alkaline electrochemical cell is disclosed, comprising a container, and an electrode assembly disposed within the container and comprising a positive electrode comprising manganese dioxide, a negative electrode, a separator located between the positive electrode and the negative electrode, and an alkaline electrolyte, wherein the negative electrode comprises zinc, solid zinc oxide and a surfactant comprising a water soluble block copolymer having at least two different types of functional groups, wherein the zinc is present is an amount from 62 to 70 weight percent, wherein the solid zinc oxide is present in an amount from 1.5 to 5.0 weight percent, and wherein the surfactant is present in an amount from 0.00064 to 0.20 weight percent, wherein all weight percents are based on the total weight of the negative electrode.

BRIEF DESCRIPTION OF THE DRAWINGS

The invention will be better understood and other features and advantages will become apparent by reading the detailed description of the invention, taken together with the drawings, wherein:

FIG. 1 is a cross-sectional elevational view of an alkaline electrochemical cell of the present invention.

DETAILED DESCRIPTION OF THE INVENTION

The invention will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the invention. However, it is to be understood that cells according to the invention can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted.

In FIG. 1, an electrochemical cell 1 is shown, including a container or can 10 having a closed bottom end 24, a top end 22 and sidewall 26 therebetween. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties, that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is the preferred main active material for the negative electrode of the present invention. Preferably, the volume of zinc utilized in the negative electrode is sufficient to maintain a desired particle-to-particle contact and a desired anode to cathode (A:C) ratio. The volume of zinc in the negative electrode can range from about 20 to about 30 volume percent, more preferably about 24 to about 28 volume percent. Notably, the solids packing of the negative electrode mix remains relatively unchanged from previously known designs, despite a lower overall concentration of zinc, because the relative volume contributions by the zinc and the zinc oxide are similar. The volume percent zinc is determined by dividing the volume of zinc by the volume of the negative electrode just prior to dispensing the negative electrode into the separator lined cavity as will be explained below. The volume percent zinc must be determined before dispensing the negative electrode into the separator basket because a portion of the electrolyte incorporated into the negative electrode migrates into the separator and cathode as soon as the negative electrode is inserted into the cavity defined by the separator. The volume percent zinc is based on the density of zinc (7.13 g/cc), the volume of the negative electrode mix and the weight of the negative electrode mix.

Particle-to-particle contact should be maintained during the useful life of the battery. If the volume of zinc in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged zinc particles, conductive electrochemically formed zinc oxide, or a combination thereof. A voltage drop can occur after zinc oxide has started to form, but before a sufficient network is built to bridge between all zinc particles present. Therefore, as the zinc reacts, eventually there is not enough zinc to form a continuous network, but there may not be enough zinc oxide to bridge the remaining zinc particles. As more electrochemical zinc oxide is formed, the conductive matrix can reform as zinc oxide is less dense than zinc and takes up more space, thereby bridging the zinc particles. If the voltage remains low, the cell must be replaced by the consumer. If the voltage quickly recovers to an acceptable value, the device may resume working in a normal manner. However, the consumer could incorrectly perceive that the temporary interruption in the device's performance is a sign that the battery is about to expire and may be motivated to replace the cell prematurely. Relatively higher concentrations of zinc can create reduction in the amounts of solid zinc oxide that can be utilized leading to reduced DSC (digital still camera) service, or gelled electrolyte leading to high viscosities and yield stresses causing negative electrode dispensing difficulties. Lower concentrations of zinc can cause lower service on substantially all rate tests due to the decreased presence of active material.

Zinc suitable for use in the present invention may be purchased from a number of different commercial sources under various designations, such as BIA 100, BIA 115. Umicore, S. A., Brussels, Belgium is an example of a zinc supplier. In a preferred embodiment, the zinc powder generally has 25 to 40 percent fines less than 75 mm, and preferably 28 to 38 percent fines less than 75 mm. Generally lower percentages of fines will not allow desired DSC service to be realized and utilizing a higher percentage of fines can lead to increased gassing. A correct zinc alloy is needed in order to reduce negative electrode gassing in cells and to maintain test service results.

The amount of zinc present in the negative electrode ranges generally from about 62 to about 70 weight percent, desirably from about 64 to about 68 weight percent, and preferably about 65 to about, 66 weight percent based on the total weight of the negative electrode, i.e., zinc, solid zinc oxide, surfactant and gelled electrolyte.

Solid zinc oxide is present in the negative electrode of the present invention. It has been found that the solid zinc oxide and water soluble block copolymer surfactant as described herein are synergists and significantly improve DSC service when compared to an electrochemical cell including a negative electrode without the solid zinc oxide and surfactant. The solid zinc oxide and surfactant do not appreciably impair relatively lower rate service, if at all. The solid zinc oxide is present in the negative electrode in an amount from about 1.5 to about 5 weight percent, and preferably from about 2 to about 3 weight percent based on the total weight of the negative electrode. The volume of solid zinc oxide is preferably from about 1 to about 2 volume percent based on the total volume of the negative electrode. A higher concentration of solid zinc oxide will increase high rate service, such as DSC service, but also increase negative electrode viscosity and yield stress which can create negative electrode dispensing problems. Lower concentrations of solid zinc oxide will decrease high rate DSC service.

It has been unexpectedly discovered that the surface area of the solid zinc oxide is an important characteristic for providing DSC service improvement. As the BET surface area of the solid zinc oxide utilized within the negative electrode is increased, the negative electrode conductivity is improved and the DSC service tends to be increased. The BET surface area impacts surfactant adsorption on solid zinc oxide surface and thus impacts surface charge properties of the solid zinc oxide. The solid zinc oxide BET surface area is generally greater than 8 $m^2/g$, desirably greater than 20 $m^2/g$, and preferably greater than 40 $m^2/g$. The BET surface area can be measured on a TriStar 3000 BET specific surface area analyzer from Micrometrics having a multi-point calibration after the solid zinc oxide sample has been degassed for one hour at 150° C. Solid zinc oxide suitable for use in the present invention generally has a particle size D5O (mean diameter) greater than 2 microns and preferably is about 5 microns. The particle size of the ZnO was measured using a CILAS particle size analyzer. The solid ZnO was dispersed in water and placed within a 350 ml cell and agitated with ultrasonic waves during the analysis. It is further believed that the zinc oxide and surfactant present in the negative electrode change the discharged zinc oxide formation pattern and disperse the zinc oxide discharge product shell around the zinc, thereby improving hydroxyl ion transfer to the zinc, and improving the concentration polarization. DSC service improvement is believed to be due from both the lower cell internal resistance and concentration polarization reduction. Solid zinc oxide, useful in the negative electrode of the invention, may be purchased from Global Chemical Company of Bangpoo Samutprakarn, Thailand and Pan-Continental Chemical Co., Ltd. of Tachia, Taiwan.

The solid zinc oxide utilized in the present invention is preferably highly active in order to increase high rate service, such as DSC service, as well as to increase anode rheology and reduce DSC service variability. The amount of active solid zinc oxide is generally greater than 90 percent and preferably greater than 95 percent based on the total weight of the solid zinc oxide present in the anode composition.

The solid zinc oxide added to the anode preferably has high purity and includes low levels of impurities that can result in higher zinc gassing and lowered service. The solid zinc oxide preferably contains less than 30 ppm iron, less than 3 ppm of silver and arsenic, less than 1 ppm of each of copper, nickel, chromium and cadmium, less than 0.50 ppm each of molybdenum, vanadium and antimony, less than 0.1 ppm tin and less than 0.05 ppm germanium.

A surfactant that is either a nonionic or anionic surfactant, or a combination thereof is present in the negative electrode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the surfactant reduces anode resistance increase caused by the addition of solid zinc oxide because the absorbed surfactant on solid zinc oxide results in enhanced surface charge density of solid zinc oxide particle surface. The higher the BET surface area of solid zinc oxide, the more surfactant can be adsorbed on the solid zinc oxide surface.

The preferred surfactant is DISPERBYK-190 from BYK-Chemie GmbH of Wesel, Germany. The surfactant is present in an amount sufficient to disperse the solid zinc oxide, preferably about 0.00064 to about 0.20 weight percent or more, based on the total weight of the negative electrode. DISPERBYK-190 is believed to be a solution including a water soluble, high molecular weight block copolymer including one or more functional groups, believably at least two different types of functional groups. The surfactant has an anionic/nonionic character due to the respective functional groups thereof. It is further believed that the number average molecular weight of a block copolymer DISPERBYK-190 is greater than 1000 measured utilizing gel permeation chromatography. Water solubility may be offset by the presence of a hydrophobic component if present in the electrode composition. In one embodiment, the surfactant is utilized in an amount from about 10 to about 100 ppm and preferably from about 15 to about 50 ppm of zinc utilized in the negative electrode. It is believed that DISPERBYK-190 does not contain any organic solvents and is, therefore, suitable for aqueous systems. DISPERBYK-190 has an acid value in mg KOH/g of 10 and a density of 1.06 g/ml at 20° C.

The aqueous alkaline electrolyte comprises an alkaline metal hydroxide such as potassium hydroxide, sodium hydroxide, or the like, or mixtures thereof. Potassium hydroxide is preferred. The alkaline electrolyte used to form the gelled electrolyte of the negative electrode contains the alkaline metal hydroxide in an amount from about 26 to about 36 weight percent, desirably from about 26 to about 32 weight percent, and preferably from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount or gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and preferably about 32 weight percent based on the total weight of the negative electrode. Volume percent of the gelled electrolyte is preferably about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment of the present invention, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining portion of the 29 weight percent KOH solution is injected into the separator lined cavity after the negative electrode has been inserted.

The negative electrode suitable for use in the present invention after degassing has a negative electrode density generally from about 96 to 100 percent, preferably from about 98 to 100 percent, calculated by dividing the actual weight over actual volume by the theoretical weight over actual volume. The addition of the solid zinc oxide to the negative electrode provides for increased viscosity of the gelled negative electrode prior to addition to the cell. Negative electrode viscosity ranges generally from about 70,000 to about 100,000 cps, and preferably from about 70,000 to about 95,000 cps for an LR6 type cell. As negative electrode viscosity is relatively high when compared with other negative electrode mixes, processing conditions can be optimized, such as by reducing cell throughput or processing speed, balancing negative electrode dispensing rate, and nozzle pull-out rate, for example. Pump size, piston outer diameter, and nozzle inner diameter as well as pump timing and pump stroke speed can influence dispensing of the negative electrode into the container. The weight of the negative electrode ranges generally from about 6 to about 7 grams, desirably from about 6.3 to about 6.7 grams, and preferably from about 6.37 to about 6.61 grams for an LR6 type cell.

Second electrode 12, also referred to herein as the positive electrode or cathode, preferably includes manganese dioxide as the electrochemically active material. Manganese dioxide is present in an amount generally from about 80 to about 86 weight percent and preferably from about 81 to 85 weight percent by weight based on the total weight of the positive electrode, i.e., manganese dioxide, conductive material, positive electrode electrolyte and additives such as barium sulfate. Manganese dioxide is commercially available as natural manganese dioxide (NMD), chemical manganese dioxide (CMD), or electrolytic manganese dioxide (EMD). The preferred manganese dioxide for use in a cell of this invention is EMD. Suppliers of EMD include Kerr-McGee Chemical Corporation of Oklahoma City, Okla.; Tosoh Corporation of Tokyo, Japan, Delta EMD of Newcastle, Australia and Erachem Comilog, Inc. of Baltimore, Md. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising manganese dioxide and then inserting the rings into the container to form the tubular-shaped second electrode. The cell shown in FIG. 1 would typically include 3 or 4 rings.

The positive electrode can include other components such as a conductive material, for example graphite, that when mixed with the manganese dioxide provides an electrically conductive matrix substantially throughout the positive electrode. Conductive material can be natural, i.e., mined, or synthetic, i.e., manufactured. In one embodiment, the cells of the present invention include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce manganese dioxide input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component, such as the manganese dioxide, conductive material, and barium sulfate are mixed together to form a homogeneous mixture. During the mixing process, an alkaline electrolyte solution, such as from about 37% to about 40% KOH solution, is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, as well as spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell of the present invention that utilizes zinc in the negative electrode or anode and manganese dioxide in the positive electrode or cathode, the A:C ratio is preferably greater than 1.32:1, desirably greater than 1.34:1, and preferably 1.36:1 for impact molded positive electrodes. The A:C ratio for ring molded positive electrodes can be lower, such as about 1.2:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

Example 1

In order to evaluate cells of the present invention including a negative electrode including solid zinc oxide and surfactant Disperbyk-190, control cells without solid zinc oxide and surfactant and cells of the invention were individually tested utilizing the DSC test procedure and the length of time each cell's closed circuit voltage remained above a minimum value was recorded. The DSC test is considered a "high rate" test and is indicative of cell performance for high rate uses such as in devices, for example a digital camera. The DSC test cycles the electrochemical cell utilizing two pulses, the first pulse at 1500 mW for 2 seconds followed by the second pulse at 650 mW for 28 seconds. The pulse sequence is repeated 10 times, followed by a rest period for 55 minutes. Afterwards, the pulse sequence and rest period are repeated to a predetermined cut-off voltage, 1.05 volts for the test performed herein. The time to 1.05 volts is recorded.

Electrochemical cells, namely LR6 size cells, were constructed as follows. The physical arrangement of the cells, electrodes, separator, closure assembly and container is shown in FIG. 1. The positive electrode of the inventive cells utilized included manganese dioxide (84.01 weight percent), graphite (6.45 weight percent), 37% KOH aqueous alkaline electrolyte (8.35 weight percent), and barium sulfate (1.19 weight percent). The manganese dioxide, graphite and barium sulfate were mixed together to form a homogenous mixture. The 37% KOH solution was evenly dispersed therein. The negative electrode included zinc (65.497 weight percent), 28.82% gelled electrolyte (32.137 weight percent), solid zinc oxide (2.231 weight percent), and DISPERBYK-190 surfactant (0.135 weight percent). The gelled electrolyte was formed of a 28.8 percent by weight KOH solution, 1.7 weight percent of a gelling agent (Carbopol), 1% zinc oxide, and 0.3% sodium silicate. Control cells included additional zinc in place of the solid zinc oxide and DISPERBYK-190 surfactant.

The positive electrode materials mixed together were added to the container. A shaping ram was forcefully inserted into the positive electrode material thereby impact molding the powder into a solid tubular shaped component. The total weight of the positive electrode was 10.80±0.4 grams. Next, a separator was inserted into the cavity formed by the ram. The separator was two layers of H&V BVA 03039 separator. A 6.49±0.12 gram quantity of the negative electrode was added into the separator lined cavity. In addition to the electrolyte contained within the negative electrode, another 0.97 grams of 29 percent by weight KOH solution was disposed into the separator lined cavity, with about 0.87 grams added to the separator lined cavity before the negative electrode was inserted, and the remaining portion injected after the negative electrode was inserted into the container. A closure assembly was then secured to the open end of the container. A terminal cover including a current collector and label were secured to the outer surface of the container.

According to the DSC tests performed on the Control and Example cells, minutes to 1.05 volts were greater for the Example cells when compared to the Control cells, with the Example cells having a 32% greater service time on average.

Advantageously, the cells of the present invention including solid zinc oxide and surfactant within the negative electrode provide increased high rate service as evidenced by the greater service minutes to cut-off according to the digital still camera test.

Example 2

Comparison of Solid Zinc Oxides Having Different BET Surface Areas in Electrochemical Cells It was unexpectedly discovered that the BET surface area of the solid zinc oxide impacted DSC test results as well as anode resistance in cells including the surfactant, Disperbyk-190. LR6 size cells were constructed as follows. The physical arrangement of the cells, electrodes, separator, enclosure assembly and container is shown in FIG. 1. The positive electrode of each cell included manganese dioxide (84.01 weight percent), graphite (6.45 weight percent), 37% KOH aqueous alkaline electrolyte (8.35 weight percent), and barium sulfate (1.19 weight percent). The manganese dioxide, graphite and barium sulfate were mixed together to form a homogenous mixture. The 37% KOH solution was dispersed therein. The negative electrode included NGBIA 100 zinc (65 weight percent), 30% gelled electrolyte (31.9987 weight percent), solid zinc oxide (3 weight percent), and DISPERBYK-190 surfactant (0.0013 weight percent). The gelled electrolyte was formed of a 30 percent by weight KOH solution, 1.7 weight percent of a gelling agent (Carbopol), 1 weight percent zinc oxide dissolved in the KOH solution, and 0.3% sodium silicate.

The positive electrode materials mixed together were added to the container. A shaping ram was forcefully inserted into the positive electrode material thereby impact molding the powder into a solid tubular shaped component. The total weight of the positive electrode was 10.8 grams. Next, a separator was inserted into the cavity formed by the ram. The separator was two layers of H&V BVA 03039 separator. A 6.49 gram quantity of the negative electrode was added into the separator lined cavity. In addition to the electrolyte contained within the negative electrode, another 0.97 grams of 37 percent by weight KOH solution was dispensed into the separator lined cavity, with about 0.87 grams added to the separator lined cavity before the negative electrode was inserted, and the remaining portion injected after the negative electrode was inserted into the container. A closure assembly was then secured to the open end of the container. A terminal cover including a current collector and label were secured to the outer surface of the container.

Six different types of cells were tested with the difference being the BET surface area of the solid zinc oxide utilized. The anode resistance of each type of cell having a different BET surface area was tested. The anode resistance was measured using a Solartron SI 1287 impedance analyzer. A 5 cc plastic cylinder was filled with anode and the ends were closed with gold tab electrodes and sealed with parafilm so that the impedance measurement could be made. Cells having the indicated zinc oxide with different BET surface areas were individually tested using the DSC test procedure described. The length of time each cell's closed circuit voltage remained above 1.05 volts was recorded. The results of the anode resistance and DSC test results are set forth in Table I below. The BET surface area was calculated as described hereinabove.

TABLE I

| Solid Zinc Oxide BET Surface Area of Cell (m$^2$/g) | Negative Electrode Resistance (ohms) | DSC Service (Min. to 1.05 v cut-off) |
|---|---|---|
| 4.4 | 0.3 | 48 ± 3 |
| 11.1 | 0.1 | 53 ± 4 |

TABLE I-continued

| Solid Zinc Oxide BET Surface Area of Cell (m²/g) | Negative Electrode Resistance (ohms) | DSC Service (Min. to 1.05 v cut-off) |
|---|---|---|
| 14.4 | 0.11 | 52 ± 2 |
| 27.6 | 0.08 | 51 ± 2 |
| 37.1 | 0.04 | 59 ± 4 |
| 41.6 | 0.05 | 52 ± 6 |

As indicated in Table I, negative electrode resistance was less when BET surface area of the solid zinc oxide exceeded 4.4 m²/g. Moreover, unexpectedly the DSC service time was greater when the BET surface area exceeded 4.4 m²/g. Accordingly, it has been demonstrated that solid zinc oxide having a relatively high BET surface area in combination with the described surfactant is useful in a preferred embodiment of the present invention.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A primary alkaline electrochemical cell, comprising:
a container;
an electrode assembly disposed within the container and comprising a positive electrode, a negative electrode, a separator located between the positive electrode and the negative electrode, and an alkaline electrolyte, wherein the negative electrode comprises zinc, solid zinc oxide and a surfactant adsorbed on a surface of the solid zinc oxide, wherein the surfactant comprises a water soluble block copolymer, and wherein the block copolymer has at least one anionic functional group and at least one nonionic functional group; and
wherein the zinc is present in an amount from 64 to 68 weight percent based on the total weight of the negative electrode, wherein the solid zinc oxide is present in an amount from 1.5 to 5.0 weight percent based on the total weight of the negative electrode, wherein the solid zinc oxide has a BET surface area greater than 20 m²/g, wherein the solid zinc oxide has a D50 particle size greater than 2 microns, and wherein the surfactant is present in an amount from 0.00064 to 0.20 weight percent based on the total weight of the negative electrode.

2. The cell according to claim 1, wherein the block copolymer has a number average molecular weight greater than 1000.

3. The cell according to claim 1, wherein the solid zinc oxide is present in an amount from 2 to 3 weight percent based on the total weight of the negative electrode and wherein the negative electrode further comprises dissolved zinc oxide.

4. The cell according to claim 3, wherein the solid zinc oxide has a BET surface area greater than 40 m²/g, wherein the negative electrode includes a gelling agent and wherein the positive electrode comprises manganese dioxide.

5. A primary alkaline electrochemical cell, comprising:
a container;
an electrode assembly disposed within the container and comprising a positive electrode comprising manganese dioxide, a negative electrode, a separator located between the positive electrode and the negative electrode, and an alkaline electrolyte, wherein the negative electrode comprises zinc, solid zinc oxide and a surfactant comprising a water soluble block copolymer, and wherein the solid zinc oxide has a BET surface area greater than 20 m²/g; and
wherein the zinc is present in an amount from 64 to 68 weight percent based on the total weight of the negative electrode, wherein the solid zinc oxide is present in an amount from 1.5 to 5.0 weight percent based on the total weight of the negative electrode, wherein the solid zinc oxide has a D50 particle size greater than 2 microns, wherein the surfactant is present in an amount from 0.00064 to 0.20 weight percent based on the total weight of the negative electrode, and wherein the block copolymer has at least one anionic functional group.

6. The cell according to claim 5, wherein the block copolymer has at least two different functional groups and a number average molecular weight greater than 1000.

7. The cell according to claim 5, wherein the solid zinc oxide is present in an amount from 2 to 3 weight percent based on the total weight of the negative electrode and wherein the negative electrode further comprises dissolved zinc oxide.

8. A primary alkaline electrochemical cell, comprising:
a container;
an electrode assembly disposed within the container and comprising a positive electrode comprising manganese dioxide, a negative electrode, a separator located between the positive electrode and the negative electrode, and an alkaline electrolyte, wherein the negative electrode comprises zinc, solid zinc oxide and a surfactant comprising a water soluble block copolymer having at least two different types of functional groups, wherein the zinc is present is an amount from 64 to 68 weight percent, wherein the solid zinc oxide is present in an amount from 1.5 to 5.0 weight percent, and wherein the surfactant is present in an amount from 0.00064 to 0.20 weight percent, wherein all weight percents are based on the total weight of the negative electrode; and
wherein the solid zinc oxide has a BET surface area greater than 20 in²/g and wherein the solid zinc oxide has a D50 particle size greater than 2 microns.

9. The cell according to claim 8, wherein the solid zinc oxide is present in an amount from 2 to 3 weight percent based on the total weight of the negative electrode and wherein the negative electrode further comprises dissolved zinc oxide.

10. The cell according to claim 9, wherein the block copolymer has a number average molecular weight greater than 1000 and wherein the block copolymer has at least one anionic functional group and at least one nonionic functional group.

* * * * *